(12) United States Patent
Moulton et al.

(10) Patent No.: US 10,843,929 B2
(45) Date of Patent: Nov. 24, 2020

(54) PROCESS FOR SSZ-39 SYNTHESIS USING MODIFIED REACTION COMPOSITION

(71) Applicant: SACHEM, INC., Austin, TX (US)

(72) Inventors: Roger Moulton, Austin, TX (US); Charles B. Little, Austin, TX (US)

(73) Assignee: SACHEM, Inc., Austin, TX (US)

( * ) Notice: Subject to any disclaimer, the term of this patent is extended or adjusted under 35 U.S.C. 154(b) by 0 days.

(21) Appl. No.: 16/622,977

(22) PCT Filed: Jun. 19, 2018

(86) PCT No.: PCT/US2018/038237
§ 371 (c)(1),
(2) Date: Dec. 16, 2019

(87) PCT Pub. No.: WO2018/236836
PCT Pub. Date: Dec. 27, 2018

(65) Prior Publication Data
US 2020/0115247 A1    Apr. 16, 2020

Related U.S. Application Data

(60) Provisional application No. 62/685,059, filed on Jun. 14, 2018, provisional application No. 62/521,949, filed on Jun. 19, 2017.

(51) Int. Cl.
*C01B 39/48* (2006.01)
*B01J 29/70* (2006.01)
*C01B 39/02* (2006.01)

(52) U.S. Cl.
CPC ............ *C01B 39/026* (2013.01); *B01J 29/70* (2013.01); *C01B 39/48* (2013.01)

(58) Field of Classification Search
CPC ................................ C01B 39/48; B01J 29/70
See application file for complete search history.

(56) References Cited

U.S. PATENT DOCUMENTS

| 5,958,370 A | 9/1999 | Zones et al. |
| 8,206,498 B2 | 6/2012 | Garcia-Martinez et al. |
| 9,296,620 B2 | 3/2016 | Davis |
| 9,670,415 B2 | 6/2017 | Yilmaz et al. |
| 9,919,296 B2 | 3/2018 | Yang et al. |

(Continued)

FOREIGN PATENT DOCUMENTS

CN           101104146         1/2008

OTHER PUBLICATIONS

PCT/US2018/038237; PCT International Search Report and Written Opinion of the International Searching Authority dated Aug. 16, 2018.

(Continued)

*Primary Examiner* — David M Brunsman
(74) *Attorney, Agent, or Firm* — Renner, Otto, Boisselle & Sklar, LLP

(57) ABSTRACT

A process for making SSZ-39 zeolite employing at least one organic structure-directing agent (OSDA), in which a substantial quantity of the at least one OSDA, which otherwise would be required to form a zeolite such as SSZ-39, is replaced by at least one quaternary ammonium or phosphonium compound (PFA) or a mixture of two or more thereof that is not itself an OSDA for making SSZ-39. A composition including at least one oxide of silicon; faujasite; at least one organic structure directing agent (OSDA) for making SSZ-39 zeolite; at least one PFA that is not an OSDA for making SSZ-39 zeolite; an alkali metal hydroxide; and water.

19 Claims, 1 Drawing Sheet

(56) References Cited

U.S. PATENT DOCUMENTS

| | | |
|---|---|---|
| 2008/0033225 A1 | 2/2008 | Hall et al. |
| 2015/0118150 A1 | 4/2015 | Yang et al. |
| 2016/0122192 A1 | 5/2016 | Dusselier et al. |
| 2016/0144347 A1 | 5/2016 | Sano et al. |
| 2017/0056870 A1 | 3/2017 | Ojo et al. |
| 2017/0190587 A1 | 7/2017 | Li et al. |
| 2017/0259250 A1 | 9/2017 | Tanaka et al. |
| 2018/0093255 A1 | 4/2018 | Chen et al. |
| 2018/0093256 A1 | 4/2018 | Chen et al. |
| 2018/0093257 A1 | 4/2018 | Chen et al. |
| 2018/0093258 A1 | 4/2018 | Chen et al. |
| 2018/0093259 A1 | 4/2018 | Chen et al. |
| 2018/0093895 A1 | 4/2018 | Corma Canos et al. |
| 2018/0230017 A1 | 8/2018 | Ishikawa et al. |
| 2018/0250663 A1 | 9/2018 | Hotta et al. |
| 2020/0115247 A1* | 4/2020 | Moulton ................ B01J 29/70 |

OTHER PUBLICATIONS

PCT/US2018/038237; PCT International Preliminary Report on Patentability dated Sep. 17, 2019.

Michiel Dusselier et al: "Influence of Organic Structure Directing Agent Isomer Distribution on the Synthesis of SSZ-39", Chemistry of Materials, vol. 27, No. 7, Apr. 14, 2015, pp. 2695-2702.

Manuel Moliner et al; "Cu-SSZ-39, an active and hydrothermally stable catalyst for the selective catalytic reduction of NOx", Chemical Communications, vol. 48, No. 66, Jun. 27, 2012, p. 8264.

Manuel Moliner et al; "Electronic Supplementary Information (ESI) Cu-SSZ-39, an active and hydrothermally stable catalyst for the selective catalytic reduction of NOx", Jun. 27, 2012.

Paul Wagner et al; "Guest/Host Relationships in the Synthesis of the Novel Cage-Based Zeolites SSZ-35, SSZ-36, and SSZ-39", Journal of the American Chemical Society, American Chemical Society, US, vol. 122, No. 2, Dec. 31, 1999, pp. 263-273.

Paul Wagner et al: "Guest/Host Relationships in the Synthesis of the Novel Cage-Based Zeolites SSZ-35, SSZ-36, and SSZ-39—Supplementary data: synthesis of guest molecules", Journal of the American Chemical Society, vol. 122, No. 2, Dec. 31, 1999, pp. 263-273.

Nakagawa et al.; (Microporous Mesoporous Materials, 22, 1989, 69-85, a reference cited by Wagner) (Year: 1989).

Wagner et al.; JACS, 2000, Supplementary Information (Year: 2000).

* cited by examiner

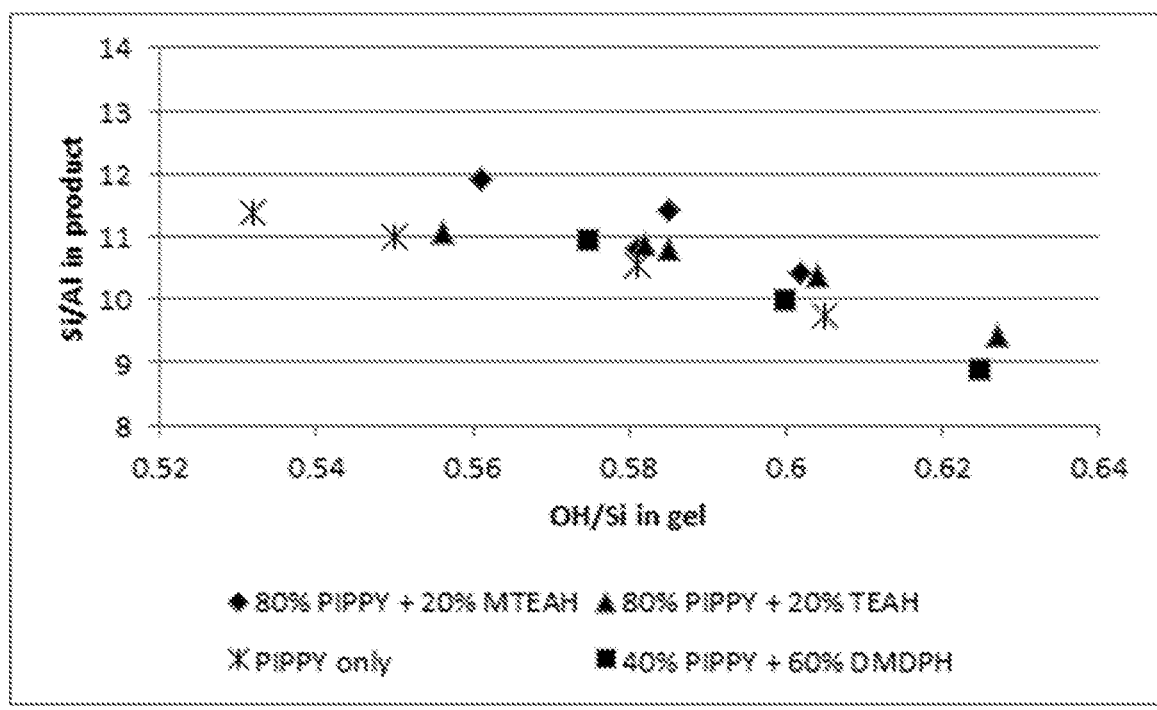

PROCESS FOR SSZ-39 SYNTHESIS USING MODIFIED REACTION COMPOSITION

CROSS-REFERENCE TO RELATED APPLICATION

The present application is a U.S. National Stage Application based on and claiming benefit and priority under 35 U.S.C. § 371 of International Application No. PCT/US2018/038237, filed 19 Jun. 2018, which in turn claims benefit under 35 U.S.C. § 119 to U.S. Provisional Application No. 62/521,949, filed 19 Jun. 2017, entitled, PROCESS FOR SSZ-39 SYNTHESIS USING MODIFIED OSDA FORMULATION, and to U.S. Provisional Application No. 62/685,059, filed 14 Jun. 2018, entitled PROCESS FOR SSZ-39 SYNTHESIS USING MODIFIED REACTION COMPOSITION, the entireties of all three of which are hereby incorporated herein by reference.

TECHNICAL FIELD

The present invention relates to processes for zeolite synthesis, specifically to a process for SSZ-39 synthesis using a modified Organic Structure Directing Agent (OSDA) formulation, in which some of the OSDA is replaced by one or more other organic base that is not itself an OSDA for SSZ-39.

BACKGROUND

The zeolite Cu-SSZ-39 has been shown to be a promising catalyst for selective catalytic reduction (SCR) of nitrogen oxides in the tailpipes of diesel-fueled internal combustion engines. The synthesis of SSZ-39 has been broadly taught in U.S. Pat. No. 5,958,370 ("the '370 patent"). The entirety of the '370 patent is hereby incorporated herein by reference. The '370 patent may be consulted for details on synthesis of SSZ-39 and other zeolites by use of an OSDA, which is referred to as a templating agent in the '370 patent. The '370 patent discloses a number of such OSDAs, including in particular, N,N-dimethyl-3,5-dimethylpiperidinium cation, which is usually provided as the hydroxide in the synthesis of SSZ-39. N,N-dimethyl-3,5-dimethylpiperidinium hydroxide may be referred to herein as PIPPY. It is known that PIPPY normally exists as a mixture of cis- and trans-isomers at the 3,5 position. Reference herein to PIPPY, without more, refers to an unspecified mixture of the cis and trans isomers.

Another important OSDA for SSZ-39 is N,N-Dimethyl-2,6-dimethylpiperidinium hydroxide. Additional OSDAs for SSZ-39 are disclosed in US 2016/0122192, and particularly the above and other 2,6-dimethyl isomers are disclosed in the '192 application. Those 2,6-isomers include, for example, N-methyl-N-ethyl-, N,N-diethyl-, and N-ethyl-N-propyl-2,6-dimethylpiperidine. The above noted '370 patent discloses a number of OSDAs known for use in making SSZ-39. Another known OSDA for SSZ-39 is tetraethylphosphonium hydroxide.

Many of the various OSDAs for SSZ-39, including those specific OSDAs mentioned in the foregoing, known in the art for preparation of zeolites, including particularly PIPPY and its isomers, are relatively expensive, as noted above. The OSDAs usually are the most expensive ingredient(s) in processes for preparation of SSZ-39 zeolites. Therefore, for at least this reason, there is a need in the art to devise processes for making zeolites, particularly SSZ-39 zeolite, that may be carried out at lower cost, using lower cost ingredients.

SUMMARY

In one embodiment, the present invention relates to a composition used in a process for making SSZ-39, in which the reaction mixture includes a blend of one or more OSDAs known for making SSZ-39, together with and one or more pore filling agent, which may be referred to herein as a PFA. In accordance with the present invention, the PFA is also an organic quaternary ammonium or phosphonium hydroxide or salt, but is one that is not an OSDA for making SSZ-39.

Although not to be bound by theory, it is considered that addition of the PFA results in a more efficient use of the OSDA, for the following reasons. It is considered that the OSDA, in the absence of the PFA, provides three functions in zeolite synthesis: The OSDA in conventional zeolite synthesis, functions as a structure directing agent (hence, its name), functions as a pore filling agent, and provides charge neutralization. The PFA, according to the present invention, provides some or all of the pore filling, the charge neutralization, or both the pore filling and charge neutralization roles in zeolite synthesis and specifically in SSZ-39 zeolite synthesis. This allows the OSDA to function primarily in its structure-directing property, while the PFA functions in the pore filling and charge neutralization functions. This is considered to enhance the reaction to make the zeolite, e.g., SSZ-39, because any OSDA that is occupied in the pore filling function is not available for the structure directing function.

In accordance with embodiments of the present invention, there is provided a process for preparation of zeolites, particularly SSZ-39, in which a portion of the OSDA for SSZ-39 is replaced with one or more pore filling agent (PFA), which is an organic base that is not an OSDA for SSZ-39. The resulting process for making SSZ-39 zeolite can be carried out with a reduced quantity of the OSDA for SSZ-39 in the reaction mixture. Among other advantages, the replacement of some of the OSDA by the PFA can result in a more economical process to make zeolites such as SSZ-39.

In the case of SSZ-39, N,N-dimethyl-3,5-dimethylpiperidinium hydroxide, PIPPY, is an excellent structure directing agent for SSZ-39. The present inventors have discovered that the other two functions of the OSDA, i.e., the roles of pore filling and charge neutralization, can be accomplished using alternative organic bases that are PFAs, but which are not OSDAs for SSZ-39, so long as sufficient OSDA is present to accomplish the structure-direction function for making SSZ-39.

In one embodiment, the process of the present invention includes, inter alia, determining the amount of OSDA that normally or otherwise would be needed or used to make the SSZ-39 zeolite, replacing a portion of the thus-determined amount of OSDA with a PFA, and then carrying out the zeolite synthesis in accordance with procedures known in the art, using the reduced amount of OSDA with the PFA.

Thus, in one embodiment, the present invention provides a process for making SSZ-39 zeolite, comprising,
  forming an aqueous reaction mixture comprising:
    at least one oxide of silicon;
    faujasite;
    at least one organic structure directing agent (OSDA) for making SSZ-39 zeolite;

at least one pore filling agent (PFA) that is not an OSDA for making SSZ-39 zeolite;
an alkali metal hydroxide; and
water; and
hydrothermally treating the aqueous reaction mixture under crystallization conditions sufficient to form crystals of the SSZ-39 zeolite.

In one embodiment, in the process, the at least one OSDA for making SSZ-39 zeolite is present in the aqueous reaction mixture in an amount that is less than an amount that would be required to form the SSZ-39 zeolite in absence of the PFA.

In one embodiment, the process further comprises:
determining a first amount of the at least one OSDA that would be used for making the SSZ-39 zeolite when combined under the crystallization conditions with the at least one source of silicon oxide and the faujasite and an alkali metal hydroxide or salt in the water without the at least one pore filling agent (PFA); and
forming the aqueous reaction mixture with a second amount of the at least one OSDA that is less than the first amount of the at least one OSDA together with the at least one pore filling agent (PFA) in an amount determined based on the difference between the first amount and the second amount of the at least one OSDA.

In one embodiment, in the process, the at least one OSDA for making SSZ-39 zeolite is one or a mixture of two or more selected from PIPPY, cis-PIPPY, trans-PIPPY, one or more 2,6-dimethyl-N,N-dialkylpiperidinium, wherein the alkyl groups may be the same or different and range from 1-4 carbon atoms, and tetraethyl phosphonium hydroxide. In one embodiment, in the process, the at least one OSDA for making SSZ-39 zeolite is a mixture of cis-PIPPY and trans-PIPPY with a content of the trans-PIPPY of greater than 20 wt. %. In one embodiment, in the process, the at least one PFA is a quaternary ammonium or phosphonium hydroxide having a general formula (I), as defined below.

In one embodiment, in the process, the at least one PFA comprises one or a mixture of two or more selected from 4,4-dimethylmorpholinium hydroxide, tetraethylammonium hydroxide (TEAH), benzyltrimethylammonium hydroxide (BnTMAH), diethyldimethylammonium hydroxide (DEDMAH), diisopropyldimethylammonium hydroxide (DiPDMAH), dimethyldipropylammonium hydroxide (DMDPAH), methyltriethylammonium hydroxide (MTEAH), choline hydroxide,
tetrabutylammonium hydroxide (TBAH), methyltributylammonium hydroxide (MTBAH), methyltripropylammonium hydroxide (MTPAH), tetrapropylammonium hydroxide (TPAH), 1,1-diethylpyrrolidinium hydroxide, 1,1-dipropylpyrrolidinium hydroxide, 1-butyl-1-methylpiperidinium hydroxide, tetrapropylphosphonium hydroxide (TPPOH), or a mixture of any two or more thereof.

In one embodiment, in the process the aqueous reaction mixture further comprises a seed quantity of SSZ-39 zeolite. In one embodiment, in the process, the at least one oxide of silicon comprises one or a mixture of two or more of tetraethyl orthosilicate (TEOS), sodium silicate, silica hydrogel, silicic acid, fumed silica, colloidal silica, a tetra-lower-(C1-C4)-alkyl orthosilicates other than TEOS, and silica hydroxide.

In one embodiment, the present invention relates to a composition comprising:
at least one oxide of silicon;
faujasite;
at least one organic structure directing agent (OSDA) for making SSZ-39 zeolite;
at least one PFA that is not an OSDA for making SSZ-39 zeolite;
an alkali metal hydroxide; and
water.

In one embodiment, the at least one OSDA for making SSZ-39 zeolite is present in the composition in an amount that is less than an amount that would be required to form the SSZ-39 zeolite in absence of the PFA. In one embodiment, the amount of the PFA in the composition is approximately equal to an amount that represents a difference between (1) the amount of the OSDA that would be required to form the SSZ-39 zeolite in the absence of the PFA, and (2) the amount of the OSDA that is actually present in the composition. In one embodiment, the at least one PFA is a quaternary ammonium or phosphonium hydroxide having a general formula (I), as defined herein. In one embodiment, the at least one PFA in the composition comprises one or a mixture of two or more selected from the above list of PFAs. In one embodiment, the at least one OSDA for making SSZ-39 zeolite in the composition is one or a mixture of two or more selected from PIPPY, cis-PIPPY, trans-PIPPY, one or more 2,6-dimethyl-N,N-dialkylpiperidinium, wherein the alkyl groups may be the same or different and range from 1-4 carbon atoms, and tetraethyl phosphonium hydroxide. In one embodiment, the at least one OSDA for making SSZ-39 zeolite in the composition is a mixture of cis-PIPPY and trans-PIPPY with a content of the trans-PIPPY of greater than 20 wt. %.

In one embodiment, the composition further comprises a seed quantity of SSZ-39 zeolite. In one embodiment, the at least one oxide of silicon in the composition comprises one or a mixture of two or more of tetraethyl orthosilicate (TEOS), sodium silicate, silica hydrogel, silicic acid, fumed silica, colloidal silica, a tetra-lower-(C1-C4)-alkyl orthosilicate other than TEOS, and silica hydroxide. The foregoing compositions are useful in the process of the present invention. In one embodiment, in the composition, the amount of the OSDA for making SSZ-39 is a reduced amount, in which the reduced amount is based on a determination of a first amount of the at least one OSDA that would be used for making the SSZ-39 zeolite when combined under the crystallization conditions with the at least one source of silicon oxide and the faujasite and an alkali metal hydroxide or salt in the water without the at least one pore filling agent (PFA); and the aqueous reaction mixture contains a second amount of the at least one OSDA that is less than the first amount of the at least one OSDA together with the at least one pore filling agent (PFA) in an amount determined based on the difference between the first amount and the second amount of the at least one OSDA.

The present invention provides a more efficient way to produce SSZ-39 and other zeolites, by partially replacing the known OSDAs with PFAs that are not themselves OSDAs, but that provide, augment, and/or replace the pore-filling function and the charge neutralization function, of the known OSDAs used in the synthesis of SSZ-39 and other zeolites.

It should be appreciated that the process steps and structures described herein may not provide a complete system or process flow for carrying out a process for preparing a zeolite or crystalline material containing oxides of silicon and aluminum and having, after calcination, a zeolite structure, e.g., SSZ-39, such as would be used in a commercial process for making these products. The present invention may be practiced in conjunction with techniques and apparatus currently used in the art, and only so much of the commonly practiced materials, apparatus and process steps are included as are necessary for an understanding of the present invention.

BRIEF DESCRIPTION OF THE FIGURE

FIG. 1 is a graph depicting the silicon/aluminum ratio, obtained in SSZ-39 zeolites in accordance with some embodiments of the present invention, plotted against OH/Si ratio in the reaction mixture.

DETAILED DESCRIPTION

As described above, the present invention provides a process for making SSZ-39 zeolite, comprising,
  forming an aqueous reaction mixture comprising:
  at least one oxide of silicon;
  faujasite;
  at least one organic structure directing agent (OSDA) for making SSZ-39 zeolite;
  at least one pore filling agent (PFA) that is not an OSDA for making SSZ-39 zeolite;
  an alkali metal hydroxide; and
  water; and
  hydrothermally treating the aqueous reaction mixture under crystallization conditions sufficient to form crystals of the SSZ-39 zeolite.

In one embodiment, the at least one OSDA for making SSZ-39 zeolite is present in the aqueous reaction mixture in an amount that is less than an amount that would be needed to form the SSZ-39 zeolite in absence of the PFA.

In one embodiment, the process further comprises:
  determining a first amount of the at least one OSDA that would be used for making the SSZ-39 zeolite when combined under the crystallization conditions with the at least one source of silicon oxide and the faujasite in the water and an alkali metal hydroxide or salt without the at least one pore filling agent (PFA); and
  forming the aqueous reaction mixture with a second amount of the at least one OSDA that is less than the first amount of the at least one OSDA together with the at least one pore filling agent (PFA) in an amount determined based on the difference between the first amount and the second amount of the at least one OSDA.

In one embodiment, the present invention relates to a composition comprising:
  at least one oxide of silicon;
  faujasite;
  at least one organic structure directing agent (OSDA) for making SSZ-39 zeolite;
  at least one PFA that is not an OSDA for making SSZ-39 zeolite;
  an alkali metal hydroxide; and
  water.
In this composition, the amount of the PFA may be determined as described above. The foregoing composition is useful in the process of the present invention.

The amount of the at least one OSDA needed to be used to form SSZ-39, and the method of determining this amount, is known in the art, and the amount can be determined by the person of ordinary skill in the zeolite arts. In accordance with the present invention, a PFA is used to replace some portion of the thus-determined amount of the at least one OSDA, to make the SSZ-39. In one embodiment, the PFA may be used in addition to the thus-determined amount of the at least one OSDA, to make the SSZ-39. Stated another way, the ratio of moles of the PFA to the total moles of PFA and OSDA is greater than zero but less than one.

In one embodiment, the at least one OSDA is present in the aqueous reaction mixture in an amount that is less than an amount that otherwise would be required to form the SSZ-39 zeolite in absence of the PFA. For example, in the absence of the PFA, i.e., in a "normal" process for making SSZ-39, the molar ratio of ingredients, based on the oxide of silicon as 1, would be:

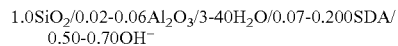

where the OSDA is, for example, PIPPY, and there is no PFA.

In the present invention some of the OSDA is replaced by the PFA, resulting in, for example, a molar ratio of ingredients, based on the oxide of silicon as 1, that would be:

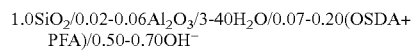

where the OSDA is, for example, PIPPY, and the PFA is, for example, tetraethylammonium hydroxide (TEAH), and where the relative amounts of OSDA and PFA may vary slightly, depending on the actual OSDA used and the actual PFA used. Since the nature of the interaction between any given OSDA and any given PFA cannot be predicted with certainty from first principles, the optimum amount of each must be experimentally determined for each combination of OSDA(s) and PFA(s). The testing needed to determine the optimum amounts of any combination of OSDA(s) and PFA(s) is relatively simple and is neither difficult nor time-consuming. Thus, the total molar amount of OSDA and PFA in the present invention may only be approximately equal to the molar amount of OSDA that would otherwise be used by itself, without the PFA, to make the SSZ-39.

As used herein, when referring to both or either of the PFA and the OSDA, it is understood that a mixture of two or more PFAs can be used, and that a mixture of two or more OSDAs may be used, in any suitable combination, whether or not this is explicitly stated.

As used herein, the terms, "OSDA", "OSDA for SSZ-39", "OSDA that would be used for making the SSZ-39 zeolite", and cognate terms, means OSDAs known in the art that are suitable for making SSZ-39 zeolite, including, but not limited to, those OSDAs disclosed in U.S. Pat. No. 5,958,370, and in U.S. Patent Application Pub. No. US 2016/0122192. Another known OSDA for SSZ-39 is tetraethylphosphonium hydroxide. A further source of possible OSDAs for SSZ-39 zeolites is disclosed in J. E. Schmidt, M. W. Deem, C. M. Lew, and T. M. Davis, "Computationally-Guided Synthesis of the 8-Ring Zeolite AEI," Top. Catal. 58 (2015) 410-415, which reports various possible OSDAs discovered through computational work based on the crystal shape of SSZ-39 and its pores. The foregoing patent, published application and article may be consulted for a list of most commonly known or proposed OSDAs for SSZ-39, as well as for methods of making SSZ-39 zeolites.

In one embodiment, the at least one OSDA for SSZ-39 is one or a mixture of two or more selected from PIPPY, cis-PIPPY, trans-PIPPY, one or more 2,6-dimethyl-N,N-dialkylpiperidinium hydroxide, wherein the alkyl groups may be the same or different and range from 1-4 carbon atoms, and tetraethylphosphonium hydroxide. In one embodiment, the at least one OSDA is a mixture of cis-PIPPY and trans-PIPPY with an enhanced content of the trans-PIPPY relative to PIPPY, as described in US 2016/0264428, which may be referenced for additional details on enhancing the trans content of PIPPY. Although these are preferred, the present invention can be carried out with any of the known OSDAs for making SSZ-39, as disclosed herein and as defined herein and above.

Unless otherwise specified, it is understood that the counter anion for the various onium ion-containing OSDAs and PFAs disclosed herein is hydroxide. It is noted that halides or carbonates or other non-interfering anion, could be used instead of hydroxide, provided there is sufficient additional base (hydroxide) in the mixture to obtain the desired alkalinity. The additional base (hydroxide) is normally more of the alkali metal hydroxide that is already included in the composition. It is preferred that the OSDA and PFA all be in the form of hydroxides.

As used herein, the terms, "pore filling agent", "PFA", "pore filling agent that is not an OSDA for making SSZ-39 zeolite", and cognate terms, means a quaternary ammonium or phosphonium moiety, as defined herein, that is not known for making, or not suitable on its own for making, SSZ-39 zeolite. Stated in other words, the PFA is a quaternary ammonium or phosphonium compound that is other than the OSDAs defined above known for use in making SSZ-39. While specific examples of PFAs are disclosed herein, it is considered that a very wide range of quaternary ammonium or phosphonium moieties may be utilized as the PFA, with the proviso that they are not OSDAs for making SSZ-39. In one embodiment, the PFA, when used in amounts in combination with the OSDA in accordance with the present invention, does not result in the formation of a zeolite other than SSZ-39. It is noted that, in some embodiments, if the amount of PFA is increased too much, and the OSDA reduced too much, a zeolite different from SSZ-39 zeolite may be formed. Thus, the amount of PFA used, relative to the amount of OSDA used, can be readily determined experimentally, by carrying out the process in small quantities, and then determining and/or identifying the zeolite that is formed. It is intended that the present invention be used for making SSZ-39 zeolite, preferably containing no more than a trace amount or a minor amount of other zeolites.

As used herein, a "trace amount" of a zeolite other than SSZ-39 is less than 2 wt. %, and a "minor" amount of a zeolite other than SSZ-39 is 2 wt. % or more but less than 10 wt. %, based on the total amount of all zeolites formed in the reaction.

In one embodiment, the at least one PFA is a quaternary ammonium or phosphonium hydroxide having a general formula (I):

wherein, in general formula (I),
A is N or P,
each of $R^1$, $R^2$, $R^3$ and $R^4$ is independently selected from $C_1$-$C_{18}$-alkyl, and $C_6$-$C_{10}$ aromatic, which may be unsubstituted or substituted with $C_1$-$C_6$ alkyl, provided that the PFA remains soluble in the aqueous reaction mixture, any two of $R^1$, $R^2$, $R^3$ and $R^4$ may form a 5- or 6-membered ring which may contain one or more O and/or N heteroatom, and
$X^-$ is an inorganic anion such as fluoride, chloride, bromide, iodide, hydroxide, sulfate, nitrate, phosphate, sulfonate, or an organic anion, such as formate, acetate, pivalate, and propionate. This is not intended to be an exhaustive list of possible anions, and others could be included, so long as they are non-interfering.

In one embodiment, the at least one PFA is selected from
4,4-dimethylmorpholinium hydroxide,
tetraethylammonium hydroxide (TEAH),
benzyltrimethylammonium hydroxide (BnTMAH),
diethyldimethylammonium hydroxide (DEDMAH),
dimethyldipropylammonium hydroxide (DMDPAH),
diisopropyldimethylammonium hydroxide (DiPDMAH,
methyltriethylammonium hydroxide (MTEAH),
choline hydroxide,
tetrabutylammonium hydroxide (TBAH),
methyltributylammonium hydroxide (MTBAH),
methyltripropylammonium hydroxide (MTPAH),
tetrapropylammonium hydroxide (TPAH),
1,1-diethylpyrrolidinium hydroxide,
1,1-dipropylpyrrolidinium hydroxide,
1-butyl-1-methylpiperidinium hydroxide,
tetrapropylphosphonium hydroxide (TPPOH),
or a mixture of any two or more thereof. In all cases, the hydroxide may be replaced by a corresponding salt, according to the definition of X above, so long as a sufficient alkalinity is present in the reaction mixture, as known in the art.

In one embodiment, the at least one oxide of silicon comprises or further comprises one or a mixture of two or more of tetraethyl orthosilicate (TEOS), inorganic silicate (preferably sodium or potassium silicates), silica hydrogel, silicic acid, fumed silica, colloidal silica, tetra-lower ($C_1$-$C_4$)-alkyl orthosilicates other than TEOS, and silica hydroxides. A suitable oxide of silicon is colloidal silica, for example, LUDOX® Colloidal Silica, available from W. R. Grace, and another is PQ Brand N Sodium Silicate.

In one embodiment, it is considered that the reduced amount of OSDA present may slow down the crystallization and lower the Si/Al ratio of the product. To minimize this, in one embodiment, the PFA is used together with a higher trans content PIPPY, which is known to be a more potent OSDA for SSZ-39 than is the cis isomer. This may be accomplished by using a source of PIPPY that contains an enhanced content of the trans isomer, as described in Applicant's US 2016/0264428.

The typical source of aluminum oxide for the reaction mixture is faujasite. When faujasite is used, it is also the source of some of the silicon in the SSZ-39 product. Faujasite is widely available commercially, for example, as Zeolite X or Zeolite Y or Zeolite USY, from Zeolyst International. In one embodiment, the faujasite is not dealuminated.

Typically, an alkali metal hydroxide such as the hydroxide of sodium, potassium, lithium, cesium, rubidium, is used in the reaction mixture to dissolve silica to form silicates, one of the precursors to SSZ-39. The relative amounts of alkalinity to be supplied by OSDA, PFA, and inorganic base vary, depending on, among other things, the amount of water in the recipe, and the Si/Al ratio of the desired product. The OSDA may be used to provide some of the hydroxide ion, and the PFA may provide the remainder or most of the remainder, in addition to any alkali metal hydroxide. Due to the low cost of alkali metal hydroxides, it is generally preferred to use one, such as NaOH or KOH, rather than any additional organic base. It may be beneficial to ion exchange, for example, the halide from a salt form of organic base (such as the OSDA or the PFA) for hydroxide ion, thereby reducing the alkali metal hydroxide quantity required. The alkali metal cation remains as part of the as-synthesized SSZ-39 material, in order to balance valence electron charges therein. This can be replaced by H+ or, a metal ion, for example, Cu++, to form a desired product, such as Cu-SSZ-39.

In one embodiment, the SSZ-39 zeolites made according to the present invention have a silicon to aluminum ratio ("SAR") in the range from 7 to 12. In one embodiment, the SSZ-39 zeolites made according to the present invention have a SAR in the range from 8 to 11. In one embodiment, the SSZ-39 zeolites made according to the present invention have a SAR in the range from 9 to 10. While it is readily possible to make zeolites according to the present invention having higher or lower SAR values, for many of the intended uses of these SSZ-39 zeolites, a SAR within these ranges is considered to be most desirable. The SAR of these zeolites may be determined by conventional analysis. This ratio represents the ratio in the rigid atomic framework of the zeolite crystal, and does not include silicon or aluminum in any binder used in catalytic applications or in any other form within the pores of the zeolite.

In one embodiment, the reaction mixture and the resulting zeolites are free or substantially free of fluorine, fluorine-containing compounds, and fluoride ions. It is understood that such fluorine-containing moieties may be present as impurities, or in trace amounts. Thus, in one embodiment, the reaction mixture and the resulting zeolites are free or substantially free of purposely added fluorine, fluorine-containing compounds, and fluoride ions.

The following example of a process for forming SSZ-39 is taken from U.S. Pat. No. 5,958,370, which may be consulted for additional information on the formation of zeolites and SSZ-39 in particular. The entire disclosure of U.S. Pat. No. 5,958,370 is incorporated herein by reference. The process described in the '370 patent may be modified as needed by the skilled person. In the Examples below, similar but somewhat different processes are described. This process, including variations thereof, may be generally referred to as "crystallization conditions". A description of a similar process, using "crystallization conditions" may be found in U.S. Pat. No. 9,296,620.

The reaction mixture, which is usually prepared at room temperature, is introduced into a closed container and is maintained at an elevated temperature until the crystals of the SSZ-39 zeolite are formed, using mild stirring or static conditions. The hydrothermal treatment is usually conducted in a closed, heated container under autogenous pressure, at a temperature between 100° C. and 200° C., preferably between 135° C. and 170° C., and typically at about 160° C. The crystallization period is typically from 1 to about 3 days. However, as noted in US 2016/0264428, with PIPPY as the OSDA, by use of the enhanced trans-content PIPPY, the reaction time can be significantly reduced.

During the hydrothermal treatment step, the SSZ-39 crystals can be allowed to nucleate spontaneously from the reaction mixture. Alternatively, some SSZ-39 crystals may be added to the reaction mixture as seeds for crystallization of more SSZ-39. The use of SSZ-39 crystals as seed material can be advantageous in decreasing the time necessary for complete crystallization to occur. In addition, seeding can lead to an increased purity of the product obtained by promoting the nucleation and/or formation of SSZ-39 over any undesired phases. When used as seeds, SSZ-39 crystals are added in an amount between 0.1 and 10% of the weight of silica and faujasite used in the reaction mixture.

Once the zeolite crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-39 zeolite crystals. The drying step can be performed at atmospheric pressure or under vacuum. The thus-formed zeolite may be calcined thereafter to remove the organic bases, e.g., the OSDA and the PFA.

In accordance with the present invention, the reaction mixture or composition initially combined and then reacted to form SSZ-39 as described herein, includes the specified ingredients at the following broad and preferred ranges of the ratios of ingredients:

| Ingredient Ratio | Broad Range | Preferred Range |
|---|---|---|
| Si/Al | 15-90 | 25-45 |
| H₂O/Si | 3-40 | 7-28 |
| OH⁻/Si | 0.4-0.8 | 0.5-0.7 |
| Q⁺/Si (Q⁺ = OSDA + PFA) | 0.03-0.25 | 0.1-0.2 |

It is noted that in the above table, OH⁻/Si includes hydroxide from all sources, including the OSDA, the PFA, and the alkali metal hydroxide.

EXAMPLES

These examples are provided to illustrate features of the invention and to provide a better understanding of the invention, and are not intended to be limiting of the scope of the invention, which is defined by the claims. In general, in embodiments of the present invention, the stoichiometry may be expressed as follows, in which Q⁻OH is the PFA and PIPPY is an example of the OSDA:

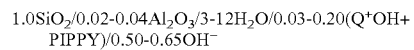

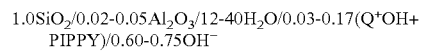

and in another embodiment, the stoichiometry may be expressed as follows, in which, again, Q⁺OH is the PFA and PIPPY is an example of the OSDA:

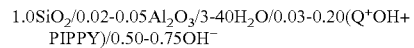

The foregoing ranges are examples, and the actual stoichiometry may vary.

General Procedure for Synthesis Using PIPPY and PFA

A silicon oxide, e.g., Ludox® AS-40 or PQ Brand N Sodium Silicate or some combination of the two, or other suitable source of silicon dioxide, is added to a PTFE cup along with a Teflon-coated magnetic stir bar. Then enough PIPPY, quaternary ammonium hydroxide or salt, as the PFA, and optionally, an additional amine, is added to achieve a desired ratio of quaternary compounds to Si, with the relative amounts of PIPPY and PFA determined as described herein. The alkali metal hydroxide is added at this time. The water content is adjusted as needed to achieve the desired H₂O/Si ratio in the reaction mixture. After a few minutes of stirring, when the silicon oxide has dissolved, enough faujasite is added to achieve the desired Si/Al ratio. The mixture is stirred at 70° C. until it is homogenous. The stir bar is removed and cup is then placed in an autoclave for 24-48 hours in an oven at 140°-160° C., with or without rotation or stirring. The autoclave is cooled and the contents removed and isolated by centrifugation or decantation. The solids are washed with water twice and dried at 125° C. overnight in air. Typical yield is 0.2-0.7 grams, depending on the Si/Al ratio of the gel. XRD analysis of the powder shows that SSZ-39 (AEI framework) is substantially the only product formed in the Examples, while substantial amounts of other zeolite phases are formed in the comparative examples. Si/Al composition of the products is measured using X-Ray Fluorescence (XRF). The results for both the invention examples and the comparative examples are shown in the tables below.

INVENTION EXAMPLES

| Example No. | Quaternary Compound (PFA) (Q) | Hrs at 160° C. | Si/Al Ratio | $H_2O/SiO_2$ | $OH^-/SiO_2$ | $PIPPY/SiO_2$ | $Q/SiO_2$ | % Trans PIPPY | Product | Product SAR |
|---|---|---|---|---|---|---|---|---|---|---|
| 1 | MTEAH | 116 | 31 | 7.8 | 0.602 | 0.136 | 0.034 | 18 | SSZ-39 ≥98% pure | 10.36 |
| 2 | MTEAH | 72 | 30.6 | 7.8 | 0.601 | 0.119 | 0.051 | 18 | SSZ-39 ≥90% pure | |
| 3 | TEAH | 116 | 31.6 | 7.9 | 0.611 | 0.136 | 0.034 | 18 | SSZ-39 ≥98% pure | 10.61 |
| 4 | TEAH | 72 | 30.9 | 7.9 | 0.609 | 0.119 | 0.051 | 18 | SSZ-39 ≥90% pure | |
| 5 | BnTMAH | 116 | 30.6 | 7.8 | 0.597 | 0.136 | 0.034 | 18 | SSZ-39 ≥99% pure | 10.13 |
| 6 | BnTMAH | 72 | 31.1 | 7.8 | 0.609 | 0.119 | 0.051 | 18 | SSZ-39 ≥90% pure | |
| 7 | DiPDMAH | 55 | 31.4 | 8 | 0.618 | 0.119 | 0.051 | 18 | SSZ-39 ≥98% pure | 10.23 |
| 8 | 1,1-Diethylpyrrolidinium OH | 89 | 32 | 7.8 | 0.601 | 0.136 | 0.034 | 18 | SSZ-39 ≥98% pure | 10.02 |
| 9 | 1,1-Dipropylpyrrolidinium OH | 89 | 31.5 | 7.8 | 0.602 | 0.102 | 0.068 | 18 | SSZ-39 ≥99% pure | 9.60 |
| 10 | 1,1-Dipropylpyrrolidinium OH | 46 | 31.2 | 7.7 | 0.606 | 0.168 | 0.102 | 18 | SSZ-39 ≥90% pure | |
| 11 | 1-Butyl-1-methylpiperidinium OH | 116 | 31.3 | 7.7 | 0.608 | 0.136 | 0.034 | 18 | SSZ-39 99% ≥pure | 9.19 |
| 12 | 1-Butyl-1-methylpiperidinium OH | 64 | 31.5 | 7.8 | 0.601 | 0.119 | 0.051 | 18 | SSZ-39 ≥90% pure | |
| 13 | 4,4-Dimethylmorpholinium OH | 90 | 30.5 | 8 | 0.602 | 0.079 | 0.021 | 18 | SSZ-39 ≥90% pure | |
| 14 | Choline hydroxide | 55 | 31.1 | 7.8 | 0.62 | 0.136 | 0.034 | 18 | SSZ-39 ≥98% pure | 9.19 |
| 15 | Choline hydroxide | 89 | 31.5 | 8.1 | 0.619 | 0.102 | 0.068 | 18 | SSZ-39 ≥90% pure | |
| 16 | DMDPAH | 46 | 31.2 | 8 | 0.603 | 0.102 | 0.068 | 20 | SSZ-39 ≥99% pure | 9.38 |
| 17 | DMDPAH | 39 | 30.6 | 7.8 | 0.601 | 0.085 | 0.085 | 20 | SSZ-39 ≥99% pure | 9.75 |
| 18 | DMDPAH | 39 | 31.4 | 7.8 | 0.605 | 0.068 | 0.102 | 20 | SSZ-39 ≥99% pure | 9.39 |
| 19 | DMDPAH | 39 | 31.3 | 7.8 | 0.600 | 0.051 | 0.118 | 20 | SSZ-39 ≥96% pure | |
| 20 | TBAH | 40 | 31.5 | 7.8 | 0.603 | 0.137 | 0.035 | 20 | SSZ-39 ≥99% pure | 10.16 |
| 21 | TBAH | 40 | 31.4 | 7.8 | 0.610 | 0.102 | 0.069 | 20 | SSZ-39 ≥99% pure | 10.56 |
| 22 | TBAH | 40 | 30.9 | 7.8 | 0.599 | 0.085 | 0.085 | 20 | SSZ-39 ≥90% pure | |
| 23 | MTBAH | 40 | 31.5 | 7.8 | 0.599 | 0.136 | 0.033 | 20 | SSZ-39 ≥99% pure | 9.58 |
| 24 | MTBAH | 40 | 30.9 | 7.8 | 0.596 | 0.101 | 0.068 | 20 | SSZ-39 ≥90% pure | |
| 25 | TPAH | 46 | 30.1 | 7.8 | 0.607 | 0.136 | 0.033 | 20 | SSZ-39 ≥98% pure | |
| 26 | TPAH | 46 | 31.0 | 7.8 | 0.608 | 0.102 | 0.068 | 20 | SSZ-39 ≥98% pure) | |
| 27 | TPAH | 46 | 31.4 | 7.8 | 0.604 | 0.084 | 0.086 | 20 | AEI + GME(minor) | |
| 28 | TEAH | 40 | 30.8 | 7.6 | 0.556 | 0.134 | 0.035 | 20 | SSZ-39 ≥98% pure | 11.06 |
| 29 | MTEAH | 40 | 30.9 | 7.8 | 0.561 | 0.135 | 0.035 | 20 | SSZ-39 ≥98% pure | 11.90 |
| 30 | TPPOH | 42.5 | 31.1 | 7.8 | 0.608 | 0.136 | 0.033 | 20 | SSZ-39 ≥99% pure | |
| 31 | TPPOH | 42.5 | 31.0 | 7.8 | 0.600 | 0.102 | 0.067 | 20 | SSZ-39 ≥99% pure | |
| 32 | TEAH | 26 | 32.0 | 34.9 | 0.726 | 0.112 | 0.028 | 28 | SSZ-39 ≥98% pure | 8.37 |
| 33 | BnTEAH | 27 | 31.2 | 34.8 | 0.724 | 0.112 | 0.028 | 28 | SSZ-39 ≥99% pure | 7.52 |

| Example No. | Quaternary Compound (PFA) (Q) | Hrs at 160° C. | Si/Al Ratio | H₂O/ SiO₂ | OH–/ SiO₂ | PIPPY/ SiO₂ | Q/ SiO₂ | % Trans PIPPY | Product | Product SAR |
|---|---|---|---|---|---|---|---|---|---|---|
| 34 | MTEAH | 27 | 32.0 | 34.8 | 0.725 | 0.112 | 0.028 | 28 | SSZ-39 ≥98% pure | 8.06 |
| 35 | DEDMAH | 27 | 31.7 | 34.7 | 0.725 | 0.112 | 0.028 | 28 | SSZ-39 ≥98% pure | 7.49 |
| 36 | 1-Butyl-1-methylpiperidinium OH | 26 | 31.5 | 34.8 | 0.727 | 0.112 | 0.028 | 28 | SSZ-39 ≥98% pure | 7.48 |
| 37 | MTEAH | 24 | 31.8 | 34.8 | 0.725 | 0.084 | 0.056 | 18 | SSZ-39 ≥90% pure | |
| 38 | TEAH | 26 | 32.6 | 27.7 | 0.730 | 0.112 | 0.028 | 18 | SSZ-39 ≥98% pure | 7.44 |
| 39 | MTEAH | 26 | 32.5 | 27.8 | 0.727 | 0.112 | 0.028 | 18 | SSZ-39 ≥98% pure | 7.34 |
| 40 | DEDMAH | 26 | 31.8 | 27.8 | 0.726 | 0.112 | 0.028 | 18 | SSZ-39 ≥90% pure | |
| 41 | BnTMAH | 26 | 32.3 | 27.4 | 0.723 | 0.112 | 0.028 | 18 | SSZ-39 ≥90% pure | |
| 42 | TEAH | 27 | 31.5 | 34.9 | 0.728 | 0.116 | 0.028 | 63 | SSZ-39 ≥98% pure | 8.82 |
| 43 | MTEAH | 26 | 30.7 | 27.9 | 0.699 | 0.0835 | 0.0572 | 75 | SSZ-39 ≥96% pure | 8.28 |
| 44 | BnTMAH | 26 | 31.9 | 34.9 | 0.729 | 0.087 | 0.058 | 63 | SSZ-39 ≥90% pure | |
| 45 | MTPAH | 40 | 31.3 | 7.8 | 0.599 | 0.102 | 0.068 | 20 | SSZ-39 ≥90% pure | |
| 46 | MTEAH | 40 | 30.2 | 12.0 | 0.598 | 0.167 | 0.042 | 20 | SSZ-39 ≥90% pure | |
| 47 | TEAH | 40 | 30.4 | 12.0 | 0.596 | 0.167 | 0.042 | 20 | SSZ-39 ≥90% pure | |
| 48 | MTEAH | 40 | 31.1 | 13.9 | 0.594 | 0.167 | 0.042 | 20 | SSZ-39 ≥90% pure | |
| 49 | TEAH | 40 | 30.5 | 14.0 | 0.601 | 0.168 | 0.042 | 20 | SSZ-39 ≥90% pure | |
| 50 | MTEAH | 70 | 31.9 | 20.5 | 0.680 | 0.096 | 0.0024 | 0 | SSZ-39 ≥90% pure | |
| 51 | TEAH | 70 | 31.9 | 20.5 | 0.680 | 0.096 | 0.0024 | 0 | SSZ-39 ≥90% pure | |
| 52 | MTEA⁺Cl⁻ | 91@140EC. | 30.0 | 27.9 | 0.720 | 0.098 | 0.042 | 18 | SSZ-39 ≥90% pure | |
| 53 | MTEA+Cl⁻ | 91@140EC. | 30.0 | 28.0 | 0.723 | 0.098 | 0.042 | 75 | SSZ-39 ≥98% pure | 7.70 |

COMPARATIVE EXAMPLES

In the following examples, except for controls, an excessive amount of non-SDA organic was added, resulting in a product that contained greater than 10% of a different zeolite, as determined by XRD:

| Example No. | Quaternary Compound (Q) | Hrs at 160 C. | Si/Al Ratio | H₂O/ SiO₂ | OH–/ SiO₂ | PIPPY/ SiO₂ | Q/ SiO₂ | % Trans PIPPY | Product | Product SAR |
|---|---|---|---|---|---|---|---|---|---|---|
| C-1 | MTEAH | 72 | 31 | 7.6 | 0.613 | 0.102 | 0.068 | 18 | MIXTURE | |
| C-2 | TEAH | 72 | 30.5 | 7.8 | 0.603 | 0.102 | 0.068 | 18 | MIXTURE | |
| C-3 | BnTMAH | 72 | 30.9 | 7.8 | 0.604 | 0.102 | 0.068 | 18 | MIXTURE | |
| C-4 | None (control) | 48 | 31.0 | 7.8 | 0.601 | 0.169 | 0 | 18 | SSZ-39 ≥99% pure | 9.59 |
| C-5 | DiPDMAH | 89 | 31.3 | 7.7 | 0.606 | 0.102 | 0.058 | 18 | MIXTURE | |
| C-6 | 1,1-Diethylpyrrolidinium OH | 89 | 31.3 | 7.9 | 0.604 | 0.102 | 0.068 | 18 | MIXTURE | |
| C-7 | 1,1-Dipropylpyrrolidinium OH | 46 | 31.6 | 7.9 | 0.604 | 0.034 | 0.136 | 20 | MIXTURE | |
| C-8 | 4-Butyl-4-methylmorpholinium OH | 89 | 31.5 | 7.8 | 0.612 | 0.068 | 0.102 | 18 | MIXTURE | |
| C-9 | Choline hydroxide | 89 | 31.5 | 8.1 | 0.619 | 0.068 | 0.102 | 18 | MIXTURE | |
| C-10 | 1-Butyl-1-methylpiperidinium OH | 89 | 32.0 | 7.8 | 0.605 | 0.102 | 0.068 | 18 | MIXTURE | |
| C-11 | 4,4-Dimethylmorpholinium OH | 90 | 30.6 | 8.1 | 0.616 | 0.102 | 0.068 | 18 | OTHER | |
| C-12 | DMDPAH | 46 | 30.5 | 8 | 0.602 | 0.136 | 0.034 | 18 | OTHER | |
| C-13 | TPAH | 46 | 30.5 | 8 | 0.602 | 0.136 | 0.034 | 18 | OTHER | |

-continued

| Example No. | Quaternary Compound (Q) | Hrs at 160 C. | Si/Al Ratio | $H_2O/SiO_2$ | $OH-/SiO_2$ | $PIPPY/SiO_2$ | $Q/SiO_2$ | % Trans PIPPY | Product | Product SAR |
|---|---|---|---|---|---|---|---|---|---|---|
| C-14 | TMAH | 55 | 31.4 | 7.9 | 0.610 | 0.136 | 0.034 | 18 | OTHER | |
| C-15 | ETMAH | 55 | 31.4 | 7.9 | 0.600 | 0.136 | 0.034 | 18 | MIXTURE | |
| C-16 | DEDMAH | 116 | 31.2 | 7.8 | 0.612 | 0.136 | 0.034 | 18 | MIXTURE | |
| C-17 | TBAH | 40 | 31.4 | 7.9 | 0.608 | 0.068 | 0.103 | 20 | MIXTURE | |
| C-18 | DMDPAH | 46 | 31.1 | 7.8 | 0.530 | 0.034 | 0.136 | 20 | OTHER | |
| C-19 | MTBAH | 40 | 31.3 | 7.8 | 0.606 | 0.085 | 0.085 | 20 | OTHER | |
| C-20 | None (control) | 40 | 30.7 | 7.8 | 0.583 | 0.170 | 0.0 | 20 | SSZ-39 ≥99% pure | 10.56 |
| C-21 | TBPOH | 40 | 31.0 | 7.8 | 0.606 | 0.136 | 0.034 | 20 | OTHER | |
| C-22 | TPAH | 49 | 31.2 | 7.8 | 0.606 | 0.068 | 0.102 | 20 | OTHER | |
| C-23 | TEAH | 42 | 32.2 | 34.9 | 0.727 | 0.084 | 0.056 | 28 | MIXTURE | |
| C-24 | BnTEAH | 26 | 31.1 | 34.9 | 0.727 | 0.084 | 0.056 | 18 | MIXTURE | |
| C-25 | CyTMAH | 26 | 31.8 | 34.9 | 0.728 | 0.112 | 0.028 | 18 | OTHER | |
| C-26 | 1-Butyl-1-methylpiperidinium OH | 25 | 32.7 | 34.8 | 0.724 | 0.084 | 0.056 | 18 | MIXTURE | |
| C-27 | 1,1-Dimethylpiperidinium OH | 24 | 30.4 | 34.7 | 0.723 | 0.112 | 0.028 | 18 | OTHER | |
| C-28 | TEAH | 24 | 31.6 | 20.3 | 0.726 | 0.112 | 0.028 | 18 | OTHER/MIXTURE | |
| C-29 | MTEAH | 24 | 31.4 | 20.1 | 0.723 | 0.112 | 0.028 | 18 | OTHER/MIXTURE | |
| C-30 | DEDMAH | 24 | 31.5 | 20.1 | 0.725 | 0.112 | 0.028 | 18 | OTHER | |
| C-31 | BnTMAH | 24 | 30.6 | 20.1 | 0.720 | 0.112 | 0.028 | 18 | OTHER/MIXTURE | |
| C-32 | None (control) | 88 | 31.0 | 14.3 | 0.615 | 0.211 | 0 | 18 | SSZ-39 ≥99% pure | 10.07 |
| C-33 | None (control) | 70 | 30.8 | 12.2 | 0.601 | 0.213 | 0 | 18 | SSZ-39 ≥99% pure | 11.0 |
| C-34 | MTPAH | 48 | 30.4 | 7.8 | 0.600 | 0.084 | 0.084 | 20 | OTHER/MIXTURE | |

NOTE:
Product SAR is listed only for very pure SSZ-39 products, where determined.

It should be noted that most of the foregoing examples, and the stoichiometry shown above, include some examples with a relatively lower and some with a relatively higher water content. The invention works equally well at water contents both at and between these lower and higher water contents, and indeed, over the entire range of water contents disclosed herein. This is demonstrated by the Invention Examples 46-49, which contain quantities of water between the relatively lower and higher water contents of the many other examples.

The present invention provides the benefit of using less of the OSDA in the reaction mixture, and therefore there is less "left-over" OSDA in the mother liquor from which the SSZ-39 crystals are isolated. To demonstrate this benefit, mother liquors are analyzed for residual OSDA, e.g., PIPPY, when SSZ-39 is prepared in accordance with the prior art, i.e., without a PFA added, and for both the OSDA, e.g., PIPPY, and residual PFA, when SSZ-39 is prepared in accordance with the present invention. Three samples are prepared, one with only PIPPY as OSDA and no PFA, one with 80 wt. % aqueous PIPPY and 20 wt. % aqueous MTEAH as PFA, and one with 80 wt. % aqueous PIPPY and 20 wt. % aqueous TEAH as PFA, and the SSZ-39-forming reaction carried out as described above in the Examples. The mother liquors remaining after isolation of the SSZ-39 are analyzed for remaining PIPPY and PFA. The samples were subjected to HPLC analysis. Detected levels of the PIPPY, MTEAH and TEAH are quantified against standards of known concentration of each of these compounds.

The following table shows the quantity of the PIPPY and each of the two PFAs in the mother liquors of each of the three samples, in parts per million (ppm).

In example C-20, the starting gel had a PIPPY-to-Si ratio of 0.17, and a water-to-Si ratio of 7.8. The PIPPY concentration was about 160,000 ppm (80% cis, 20% trans). After crystallization was complete, approximately 103,000 ppm remained. In Invention Examples 28 and 29, 20 mol % of the PIPPY in the starting gel was replaced by MTEAH and TEAH, respectively, at an initial concentration of about 30,000 ppm. Most of the MTEAH and TEAH were taken up by the SSZ-39 synthesis, and only about 2000-3000 ppm remained in the solution.

| Example No. | trans-PIPPY, ppm | cis-PIPPY, ppm | MTEA+, ppm | TEA+, ppm |
|---|---|---|---|---|
| C-20 | 12300 | 91400 | | |
| 29 | 8300 | 69900 | 3200 | |
| 28 | 9000 | 76300 | | 1800 |

As is clearly apparent from the above table, the concentration of PIPPY in the mother liquor is significantly reduced in the two samples that include a PFA, as compared to a sample with only PIPPY and no PFA. This is consistent with the uptake of both PIPPY and PFA in the invention examples, which shows that the presence of the PFA results in and allows use of a smaller amount of PIPPY or other OSDA in the reaction mixture, while still obtaining high purity SSZ-39. This shows clearly that the PFA was incorporated into the crystals of SSZ-39 as a PFA. That the composition of the resulting mother liquors is lower in organic nitrogen may be beneficial in cases where the wastewater must be bio-treated.

An additional benefit of embodiments of the present invention is that use of the PFA together with PIPPY or other OSDA allows the Si/Al ratio in the product to be adjusted and controlled by changes in the OH−/Si ratio on the reaction mixture gel, from which the product SSZ-39 zeolite crystals are obtained. As shown in FIG. 1, the reaction mixtures including a PFA together with, for example, PIPPY, are compatible with SSZ-39 formation over a wide range of OH⁻/Si ratios, and result in the same or higher Si/Al ratio product as compared to the recipes containing only PIPPY or other OSDA. In addition, as shown in FIG. 1, by reducing the OH⁻/Si ratio, products with higher Si/Al ratios could be obtained.

While the principles of the invention have been explained in relation to certain particular embodiments, which are provided for purposes of illustration, it is to be understood that various modifications thereof will become apparent to those skilled in the art upon reading the specification. Therefore, it is to be understood that the invention disclosed herein is intended to cover such modifications as fall within the scope of the appended claims. The scope of the invention is limited only by the scope of the appended claims.

The invention claimed is:

1. A process for making SSZ-39 zeolite, comprising, forming an aqueous reaction mixture comprising:
at least one oxide of silicon;
faujasite;
at least one organic structure directing agent (OSDA) for making SSZ-39 zeolite;
at least one pore filling agent (PFA) that is not an OSDA for making SSZ-39 zeolite;
an alkali metal hydroxide; and
water; and
hydrothermally treating the reaction mixture under crystallization conditions sufficient to form crystals of the SSZ-39 zeolite.

2. The process of claim 1, wherein the at least one OSDA for making SSZ-39 zeolite is present in the aqueous reaction mixture in an amount that is less than an amount that would be required to form the SSZ-39 zeolite in absence of the PFA.

3. The process of claim 2, wherein the amount of the OSDA for making SSZ-39 is found by determining a first amount of the at least one OSDA that would be used for making the SSZ-39 zeolite when combined under the crystallization conditions with the at least one source of silicon oxide and the faujasite and an alkali metal hydroxide or salt in the water without the at least one pore filling agent (PFA); and
forming the aqueous reaction mixture with a second amount of the at least one OSDA that is less than the first amount of the at least one OSDA together with the at least one pore filling agent (PFA) in an amount determined based on the difference between the first amount and the second amount of the at least one OSDA.

4. The process according to claim 1 wherein the at least one OSDA for making SSZ-39 zeolite is one or a mixture of two or more selected from PIPPY, cis-PIPPY, trans-PIPPY, one or more 2,6-dimethyl-N,N-dialkylpiperidinium, wherein the alkyl groups may be the same or different and range from 1-4 carbon atoms, and tetraethyl phosphonium hydroxide.

5. The process according to claim 1 wherein the at least one OSDA for making SSZ-39 zeolite is a mixture of cis-PIPPY and trans-PIPPY with a content of the trans-PIPPY of greater than 20 wt. %.

6. The process according to claim 1 wherein the at least one PFA is a quaternary ammonium or phosphonium hydroxide having a general formula (I):

wherein, in general formula (I),
A is N or P,
each of $R^1$, $R^2$, $R^3$ and $R^4$ is independently selected from $C_1$-$C_{18}$-alkyl, and $C_6$-$C_{10}$ aromatic, which may be unsubstituted or substituted with $C_1$-$C_6$ alkyl, provided that the PFA remains soluble in the aqueous reaction mixture, any two of $R^1$, $R^2$, $R^3$ and $R^4$ may form a 5- or 6-membered ring which may contain one or more O and/or N heteroatom, and
$X^-$ is an anion selected from fluoride, chloride, bromide, iodide, hydroxide, sulfate, nitrate, phosphate, sulfonate, formate, acetate, pivalate, and propionate.

7. The process according to claim 1 wherein the at least one PFA comprises one or a mixture of two or more selected from
4,4-dimethylmorpholinium hydroxide,
tetraethylammonium hydroxide (TEAH),
benzyltrimethylammonium hydroxide (BnTMAH),
diethyldimethylammonium hydroxide (DEDMAH),
diisopropyldimethylammonium hydroxide (DiPDMAH,
dimethyldipropylammonium hydroxide (DMDPAH),
methyltriethylammonium hydroxide (MTEAH),
choline hydroxide,
tetrabutylammonium hydroxide (TBAH),
methyltributylammonium hydroxide (MTBAH),
methyltripropylammonium hydroxide (MTPAH),
tetrapropylammonium hydroxide (TPAH),
1,1-diethylpyrrolidinium hydroxide,
1,1-dipropylpyrrolidinium hydroxide,
1-butyl-1-methylpiperidinium hydroxide,
tetrapropylphosphonium hydroxide (TPPOH),
or a mixture of any two or more thereof.

8. The process according to claim 1 wherein the aqueous reaction mixture further comprises a seed quantity of SSZ-39 zeolite, in an amount between 0.1% and 10% based on weight of silica and faujasite used in the aqueous reaction mixture.

9. The process according to claim 1 wherein the at least one oxide of silicon comprises one or a mixture of two or more of tetraethyl orthosilicate (TEOS), sodium silicate, silica hydrogel, silicic acid, fumed silica, colloidal silica, a tetra-lower-($C_1$-$C_4$)-alkyl orthosilicates other than TEOS, and silica hydroxide.

10. A composition comprising:
at least one oxide of silicon;
faujasite;
at least one organic structure directing agent (OSDA) for making SSZ-39 zeolite;
at least one pore filling agent (PFA) that is not an OSDA for making SSZ-39 zeolite;
an alkali metal hydroxide; and
water.

11. The composition of claim 10, wherein the at least one OSDA for making SSZ-39 zeolite is present in the composition in an amount that is less than an amount that would be required to form the SSZ-39 zeolite in absence of the PFA.

12. The composition of claim 11, wherein the amount of the PFA in the composition is approximately equal to an amount that represents a difference between (1) the amount of the OSDA that would be required to form the SSZ-39 zeolite in the absence of the PFA, and (2) the amount of the OSDA that is actually present in the composition.

13. The composition according to claim 10 wherein the at least one PFA is a quaternary ammonium or phosphonium hydroxide having a general formula (I):

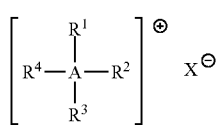

wherein, in general formula (I),
A is N or P,
each of $R^1$, $R^2$, $R^3$ and $R^4$ is independently selected from $C_1$-$C_{18}$-alkyl, and $C_6$-$C_{10}$ aromatic, which may be unsubstituted or substituted with $C_1$-$C_6$ alkyl, provided that the PFA remains soluble in the aqueous reaction mixture, any two of $R^1$, $R^2$, $R^3$ and $R^4$ may form a 5- or 6-membered ring which may contain one or more O and/or N heteroatom, and
$X^-$ is an anion selected from fluoride, chloride, bromide, iodide, hydroxide, sulfate, nitrate, phosphate, sulfonate, formate, acetate, pivalate, and propionate.

14. The composition according to claim 10 wherein the at least one quaternary ammonium or phosphonium hydroxide comprises one or a mixture of two or more selected from:
4,4-dimethylmorpholinium hydroxide,
tetraethylammonium hydroxide (TEAH),
benzyltrimethylammonium hydroxide (BnTMAH),
diethyldimethylammonium hydroxide (DEDMAH),
dimethyldipropylammonium hydroxide (DMDPAH),
diisopropyldimethylammonium hydroxide (DiPDMAH,
methyltriethylammonium hydroxide (MTEAH),
choline hydroxide,
tetrabutylammonium hydroxide (TBAH),
methyltributylammonium hydroxide (MTBAH),
methyltripropylammonium hydroxide (MTPAH),
tetrapropylammonium hydroxide (TPAH),
1,1-diethylpyrrolidinium hydroxide,
1,1-dipropylpyrrolidinium hydroxide,
1-butyl-1-methylpiperidinium hydroxide,
tetrapropylphosphonium hydroxide (TPPOH),
or mixtures of two or more thereof.

15. The composition according to claim 10 wherein the at least one OSDA for making SSZ-39 zeolite is one or a mixture of two or more selected from PIPPY, cis-PIPPY, trans-PIPPY, one or more 2,6-dimethyl-N,N-dialkylpiperidinium, wherein the alkyl groups may be the same or different and range from 1-4 carbon atoms, and tetraethyl phosphonium hydroxide.

16. The composition according to claim 10 wherein the at least one OSDA for making SSZ-39 zeolite is a mixture of cis-PIPPY and trans-PIPPY with a content of the trans-PIPPY of greater than 20 wt. %.

17. The composition according to claim 10 wherein the aqueous reaction mixture further comprises a seed quantity of SSZ-39 zeolite, in an amount between 0.1% and 10% based on weight of silica and faujasite used in the aqueous reaction mixture.

18. The composition according to claim 10 wherein the at least one oxide of silicon comprises one or a mixture of two or more of tetraethyl orthosilicate (TEOS), sodium silicate, silica hydrogel, silicic acid, fumed silica, colloidal silica, a tetra-lower-($C_1$-$C_4$)-alkyl orthosilicates other than TEOS, and silica hydroxide.

19. The composition according to claim 10, wherein the amount of the OSDA for making SSZ-39 is a reduced amount, in which the reduced amount is based on a determination of a first amount of the at least one OSDA that would be used for making the SSZ-39 zeolite when combined under the crystallization conditions with the at least one source of silicon oxide and the faujasite and an alkali metal hydroxide or salt in the water without the at least one pore filling agent (PFA); and the aqueous reaction mixture contains a second amount of the at least one OSDA that is less than the first amount of the at least one OSDA together with the at least one pore filling agent (PFA) in an amount determined based on the difference between the first amount and the second amount of the at least one OSDA.

* * * * *